United States Patent [19]

Giardina et al.

[11] Patent Number: 4,962,637
[45] Date of Patent: Oct. 16, 1990

[54] METHOD AND APPARATUS FOR LOADING WHOLESTALK CUT SUGAR CANE WITH OFFSET BOOM AND GRAPPLE

[75] Inventors: Jacob Giardina; Kenneth Rodrigue, both of Thibodaux, La.

[73] Assignee: Cameco Industries, Inc., Thibodaux, La.

[21] Appl. No.: 395,012

[22] Filed: Aug. 16, 1989

Related U.S. Application Data

[63] Continuation-in-part of Ser. No. 194,807, May 17, 1988, Ser. No. 326,535, Mar. 21, 1989.

[51] Int. Cl.$^5$ .................. A01D 55/20; A01D 87/00
[52] U.S. Cl. ........................... 56/344; 56/14.7; 56/15.6
[58] Field of Search .................... 56/344–347, 56/14.7, 14.9, 15.6, 14.3, 13.5, 14.5, 1, 192, DIG. 2, 10.1, 122, 131, 153

[56] References Cited

U.S. PATENT DOCUMENTS

| | | | |
|---|---|---|---|
| 2,669,829 | 2/1954 | Pugh | 56/14.5 X |
| 3,095,679 | 7/1963 | Pugh et al. | 56/15.1 |
| 3,298,162 | 1/1967 | Medd | 56/15.6 X |
| 3,419,896 | 12/1968 | Duncan | 56/14.7 |
| 3,448,564 | 6/1969 | Chauffe | 56/14.3 |
| 4,380,281 | 4/1983 | Duncan | 56/14.3 X |

Primary Examiner—Thuy M. Bui
Attorney, Agent, or Firm—Pravel, Gambrell, Hewitt, Kimball & Krieger

[57] ABSTRACT

A wholestalk sugar cane loader apparatus for picking up and accumulating windrowed cane wholestalks from a cane field ground surface having heap rows and furrows includes a wheeled movable carriage adapted to travel along a path defined by the carriage longitudinal center axis, generally parallel to the longitudinally extending elongated heap rows. The carriage has wheels tracking in parallel furrows and an elevated platform surface positioned adjacent the carriage for movement therewith during gathering of windrowed wholestalk cane, for accumulating wholestalk cut cane from a resting position on the cane field ground surface into a heap. An elongated boom pivotally mounted at a rotary connection to the carriage extends away from the rotary connection along a radial line defining a boom longitudinal axis. A pair of oppossed jaws is attached to a distal end portion of the boom opposite the rotary connection, the jaws being movable with respect to each other along a jaw travel path that allows the jaws to freely access the platform, the jaw travel path and the boom longitudinal axis being fixed during operation to intersect each other defining an acute angle therebetween.

22 Claims, 5 Drawing Sheets

METHOD AND APPARATUS FOR LOADING WHOLESTALK CUT SUGAR CANE WITH OFFSET BOOM AND GRAPPLE

BACKGROUND OF THE INVENTION

This application is a continuation-in-part of U.S. Patent Application, Ser. No. 07/194,807, filed May 17, 1988, and of U.S. Patent Application Ser. No. 07/326,535, filed Mar. 21, 1989.

1. Field of the Invention

The present invention relates to an improved sugar cane loading method and apparatus wherein cane is lifted upwardly from an initial position on the ground surface of a sugar cane field and discharged at a second elevated position where the cane falls into a receptacle. The cane is maintained in a generally parallel fashion so that it can be off loaded from the receptacle using a cane loader with an improved boom and grapple configuration wherein the boom axis and grapple jaw closure path axis are skewed at an acute angle with respect to each other so that the loader and a cane cart can be maintained side by side during loading, spaced a row apart to improve cane quality by eliminating cane muddying or damaging because of mud splashing or rollover.

In the method of operation, cane wholestalks are lifted upwardly with the offset, skewed boom and grapple from an initial position, and the boom travels a short approximate ninety degree (90°) arc to discharge the cane wholestalks at a second elevated position where the cane falls into a cart. The improved configuration allows the cane cart and its hauling tractor to remain one row away from the cane heap being loaded, eliminating the possibility of rolling on the cane or of mud being splashed upon the cane heap row, resulting in a cleaner cane product at the mill.

2. General Background

In the harvesting of sugar cane, each stalk of cane is cut at the bottom and at the top, creating a cut "wholestalk", and then wholestalks are piled into windrows wherein the cane is piled normal to and between two adjacent rows. In the hand harvesting of sugar cane, each stalk is cut at the bottom and at the top, and some of the time once or twice in the center portion of the stalk. These large sections of cane are still referred to as "wholestalks". Cane wholestalks are piled generally parallel to one another, each stalk extending across the rows of cane, straddling the two rows where the cane was standing and growing.

Several devices have been patented which describe the mechanical methods and apparatus used to harvest cane and to place it in windrows, which are stacks of cane perpendicular to the rows. The Duncan U.S. Pat. No. 4,380,281 for example entitled "Associated Running Gear and Piler Improvement in a Two Row Harvester and Piler" relates to a sugar cane harvester which cuts the cane at its top and bottom and thus produces wholestalks. A wholestalk as used herein refers to a stalk of cane which is cut at its base near the ground, and at its top to remove leaves, but which has not been cut into smaller pieces or "billets". Wholestalk harvesters such as the harvester shown in the Duncan '281 patent cut and then pile the cane in generally parallel fashion, perpendicular to the rows. These harvesters are also known as "soldier" harvesters because the cut cane is maintained in a vertical position, one stalk following the previous stalk (like marching soldiers) often being cut and prior to piling.

U.S. Pat. No. 3,475,886 entitled "Method of Harvesting Sugar Cane" shows a harvester which uses a constant discharge of cut cane to the left hand side of the harvester.

Other examples of cane harvesting and piling equipment include the Pugh U.S. Pat. No. 2,669,829 entitled "Cane Harvesting and Piling Machine" the Thompson U.S. Pat. No. 3,090,183 "Process for Harvesting and Piling Cane", and U.S. Pat. No. 3,448,564 entitled "Cane Harvester". These cane harvester patents are exemplary of various machines that can be used to cut and pile cane and are exemplary of cane harvesting equipment in general. Hand cut cane, also referred to as "wholestalk" cane is handled in the same basic way.

When wholestalk cane has been windrowed, it must then be lifted and placed into trucks for delivery to the sugar cane mill. Several devices are now commercially available which are used to gather and load the cane. These gathering devices are typically referred to as "cane loaders". One of the most common types of loaders is simply a wheeled device which carries a movable boom having opposed grabbing tines at the end of the boom. The tines are usually hydraulically powered and operate much like a crab claw to grab large batches or bundles of the cane. The tines lift the gathered cane up in the air and deposit it into large trucks or trailers.

One of the problems with cane gathering devices is the problem of mixing mud, dirt and rocks with the cane which produces an expensive cleaning problem at the mill. The water which is used to clean the cane of mud becomes a source of water pollution. Thus there is a need for an efficient "clean" cane loader.

Several cane loaders are commercially available. One commercial embodiment of a four wheel drive, self propelled cane loader is the Cameco SP 1,800 manufactured by the assignee of the present invention, Cameco Industries, Inc. The Cameco SP 1,800 is a hydrostatic drive, self propelled cane loader with an articulated boom mounted on the frame of the loader. The boom includes a forward end portion with a pair of spaced apart powered tines which are hydraulically actuated to open and close. The tines are fixed so that the travel path of the tines is aligned with the boom axis. In another version of the SP 1800, the tines are rotatably mounted with respect to the end of the boom.

A commercially available continuous loader is the Cameco model R-6 which uses endless inclined chains mounted on sprockets for lifting the cane stalks from the ground. After the cane is picked up by the chains it is cut into billets. Two blowers and two extractors remove leaves and dirt that was attached to the cane.

Some commercially available loaders use a forwardly inclined scoop in combination with gathering chains to the cane stalks from the ground surface. The scoop includes a forwardly curved rear section which redirects the cane forwardly so that continuous operation of the device tends to roll the cane into an ever increasing bundle which constantly communicates with the scoop. Thus the cane never leaves the scoop until it is ready for loading.

SUMMARY OF THE PRESENT INVENTION

The present invention provides a wholestalk sugar cane loading apparatus for picking up and accumulating windrowed wholestalks from a cane field ground surface, so that the collected wholestalks can be conveniently grabbed and off loaded by an offset boom with skewed tines. The apparatus includes a wheeled carriage and a basket receptacle which is supported by the carriage. The basket receptacle provides a load carrying surface for holding harvested wholestalk cane in a generally parallel bundle fashion and at an elevational position spaced vertically above the underlying cane field surface.

An inclined cane gathering mechanism includes a series of parallel laterally spaced endless chains which are mounted on sprockets, positioned adjacent the basket. The endless chains are inclined so that one end portion of the chains lift the cane off the ground, and the other end portion of the chains discharges the cane for example in a free fall fashion so that it can fall into the basket receptacle.

The basket receptacle has an elevational position spaced vertically above the underlying ground surface so that when the tines remove cane from the basket they do not dig into the underlying ground surface. This provides a clean, relatively dirt and mud free method and apparatus for lifting cane from the ground surface after it has been cut. With the method and apparatus of the present invention, there is no need to push the cane along the ground into bundles which creates a mud and dirt problem, as the cane mixes with the underlying soil surface and becomes muddy. Muddy cane stalks must be washed extensively before they are suitable for processing by the sugar mill.

An elongated boom is rotatably mounted upon the rear of the carriage laterally of the carriage centerline axis, at a rotary connection. The boom extends away from the rotary connection along a radial line defining a boom longitudinal axis. A pair of opposed jaws are attached to the distal end of the boom define a grapple, the jaws being moveable with respect to each other along a jaw travel path. This improved configuration allows the boom to make a short arc of about ninety degrees (90°) yet automatically orients the tines in proper position to grab and to unload the cane without having to use a grapple with an additional rotating device.

The jaw travel path and the boom longitudinal axis are preset "skewed", being fixed to intersect each other and define an acute angle therebetween. During operation, the boom pivots to a first pick-up position, placing the grapple to the left of the carriage centerline. Because the grapple jaws and boom are at a preset skew angle, this boom position aligns the jaw travel path with the longitudinally extending basket and at right angles to the cane wholestalks.

In a second discharge position, the boom is moved to the right side of the carriage longitudinal center axis and places the jaw travel path at generally right angles with respect to the carriage longitudinal center axis. The boom now forms an acute angle with the carriage travel path moving through a short arc of about ninety degrees (90°) from the "pick-up" to the "discharge" position.

The carriage and basket each have parallel longitudinal central axes and the boom's rotary connection is offset laterally from the carriage longitudinal axis. The acute angle between the boom and jaw travel path places the jaw travel path parallel to the carriage longitudinal axis when the boom rotates the jaws to the first "pick-up" position, left of the carriage centerline. In this position the boom defines an acute angle with the carriage longitudinal axis. In the second discharge position, the boom moves to the right of the carriage centerline, forming an acute angle therewith, and the jaw travel path is generally perpendicular to the carriage centerline.

In the preferred embodiment, the basket receptacle has multiple longitudinally extending spaced bars defining slots therebetween so that the tines of a loader can intersect the slots during loading, allowing the tines to fully encircle the cane held in the basket receptacle. In some cases, a plated or solid floor can be used. The plated floor will be scraped by the tines during loading.

In the preferred embodiment, the cane gathering mechanism maintains the cane stalks in a generally parallel position with respect to one another at all times during transfer of the cane stalks from the cane field ground surface to the basket receptacle.

In the preferred embodiment, the carriage is wheeled. However, tracks might lend themselves to adverse field conditions.

In the preferred embodiment, the cane gathering mechanism includes a frame supported at least in part by the carriage, and upper and lower moving endless chains defining therebetween a cane travel path while moving the cane stalks between the resting and discharge positions.

In the preferred embodiment, the carriage includes a frame and a plurality of wheels rotatably mounted on the frame including at least front and rear wheels, and the basket is positioned generally between the front and rear wheels.

In the preferred embodiment, there are a plurality of endless lower chains defining an upper plane and a plurality of upper endless chains defining a lower plane position generally parallel to the upper plane, and the cane stalk travel path is defined by the area between the upper and lower planes.

In the preferred embodiment, the basket includes a plurality of generally parallel grate members which are closely spaced and retain the cane stalks in a position generally perpendicular to the plurality of grate members.

In the method of the present invention, cane wholestalks that have been cut and windrowed and which are lying on the cane field ground surface in an initial resting position are gathered by first lifting the cane wholestalks from the initial resting position upwardly along a conveyor path to an elevated discharge position. The cane wholestalks are discharged so that they descend for a time interval. The descending cane stalks are then collected in a receptacle that has a lowermost surface upon which the collected cane rest, the surface being spaced vertically below the cane discharge, and vertically above the surface of the cane field ground surface a sufficient distance so that the gathered cane can be off loaded from the receptacle with tines that do not dig into the underlying cane field ground surface.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

FIGS. 1-6 illustrate the preferred embodiment of the apparatus of the present invention designated generally by the numeral 10. The cane loading apparatus of the present invention includes a chassis or carriage 11, comprised of a frame 12 and a plurality of wheels 13-16. Frame 12 provides a pivot 17 that supports boom 18 that can be comprised of multiple boom sections. The boom 18 moves in an arc upon pivot 17. Boom 18 distal end 19 supports an assembly of opposed tines or jaws 20-21. Hydraulic cylinders can be used to open and close the tines 20, 21 and in a powered fashion so that large bundles of cane stalks C can be grabbed between jaws 20, 21 and loaded into a transport vehicle such as cane wagon 25 having wheels 26-29 and central axis 25X. The loading could be into any other suitable transport vehicle such as a railroad car, truck, or the like. Wagon 25 is typically towed with tractor T having rear wheels 30-32 aligned longitudinally with wheels 27, 26 respectively so that the tractor wheels and wagon wheels track in cane furrows.

Figure 1:
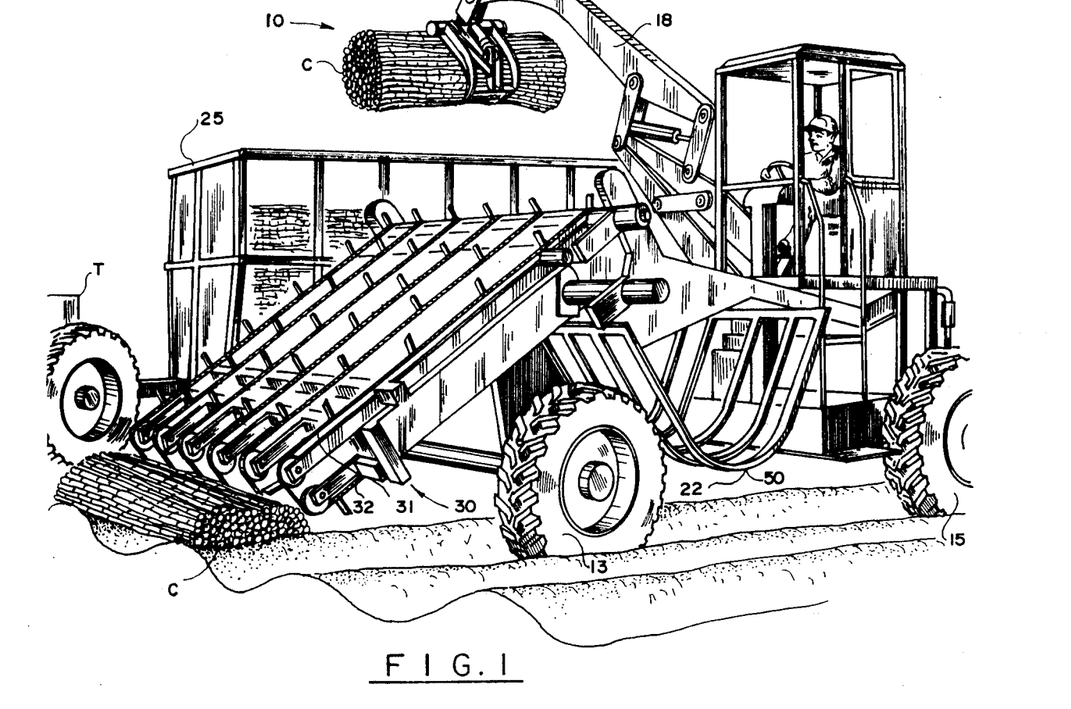
FIG. 1 is a perspective view of the preferred embodiment of the apparatus of the apparatus of the present invention.
Figure 2:
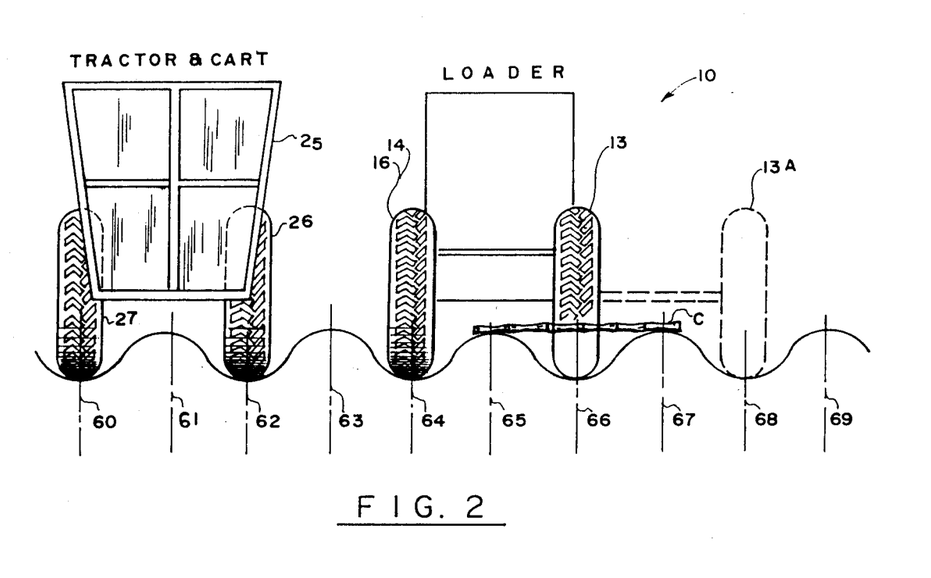
FIG. 2 is an elevational schematic view illustrating the method of the present invention.
Figure 3:
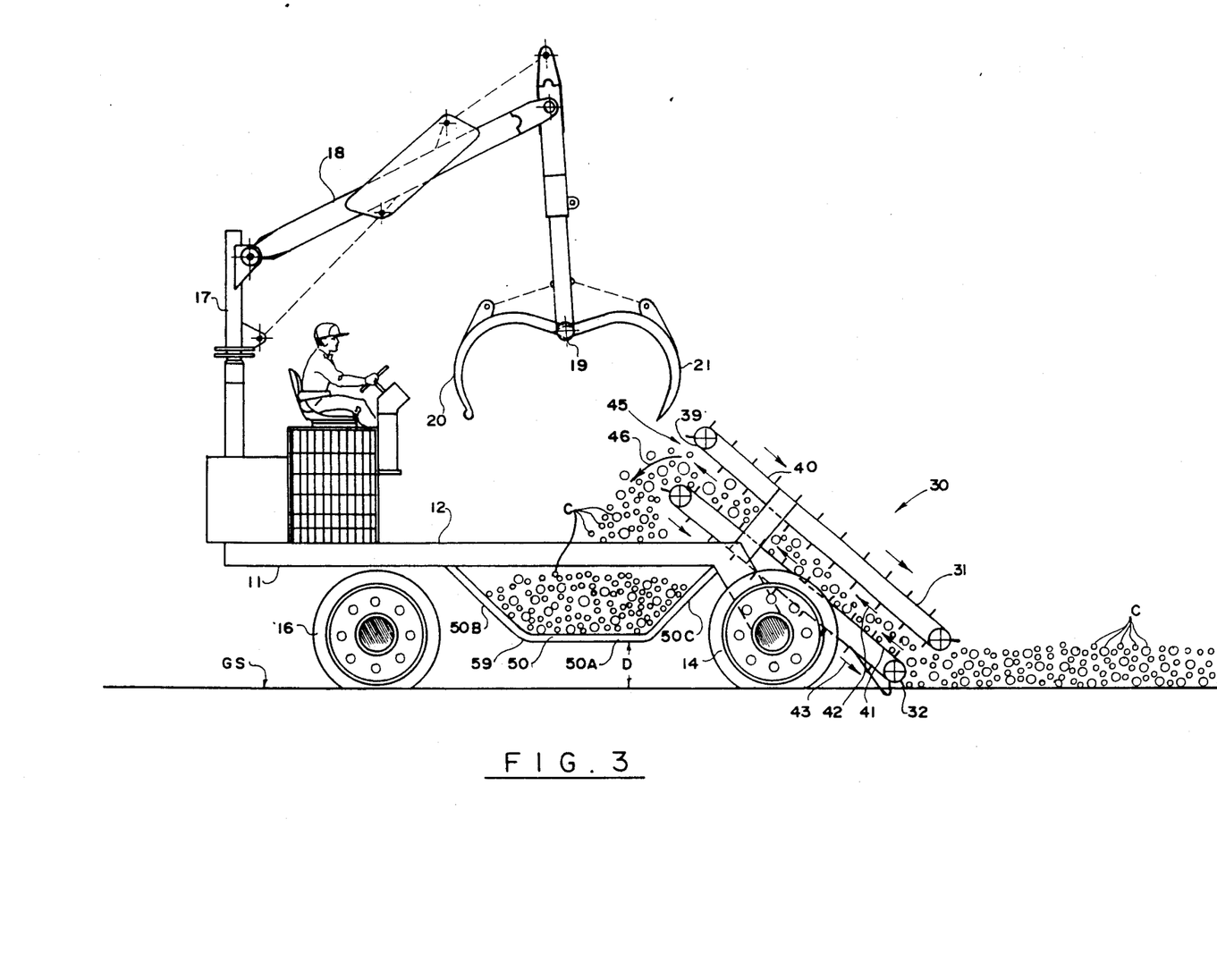
FIG. 3 is a side elevational view of the preferred embodiment of the apparatus of the present invention with the grabbing tines raised.
Figure 4:
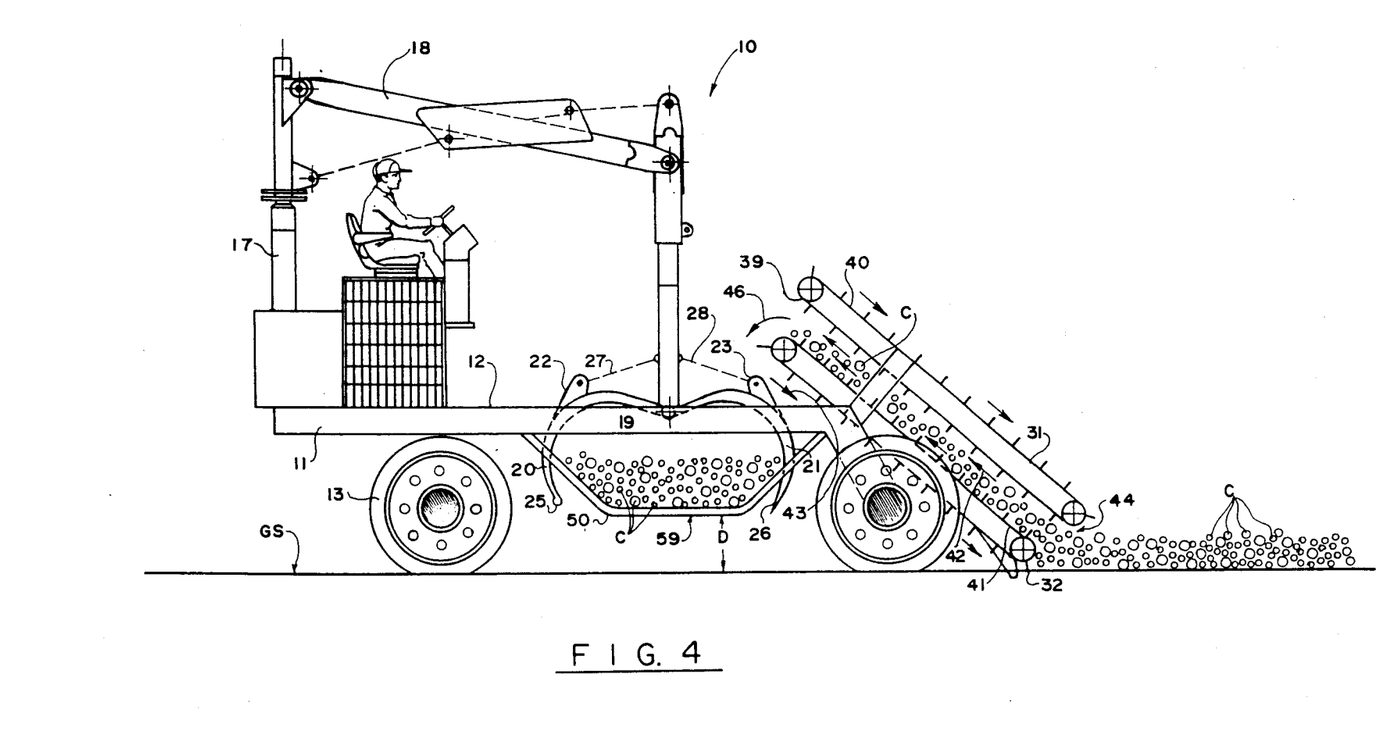
FIG. 4 is a side elevational view of the preferred embodiment of the apparatus of the present invention with the grabbing tines lowered to grasp cane wholestalks held in the basket receptacle.
Figure 5:
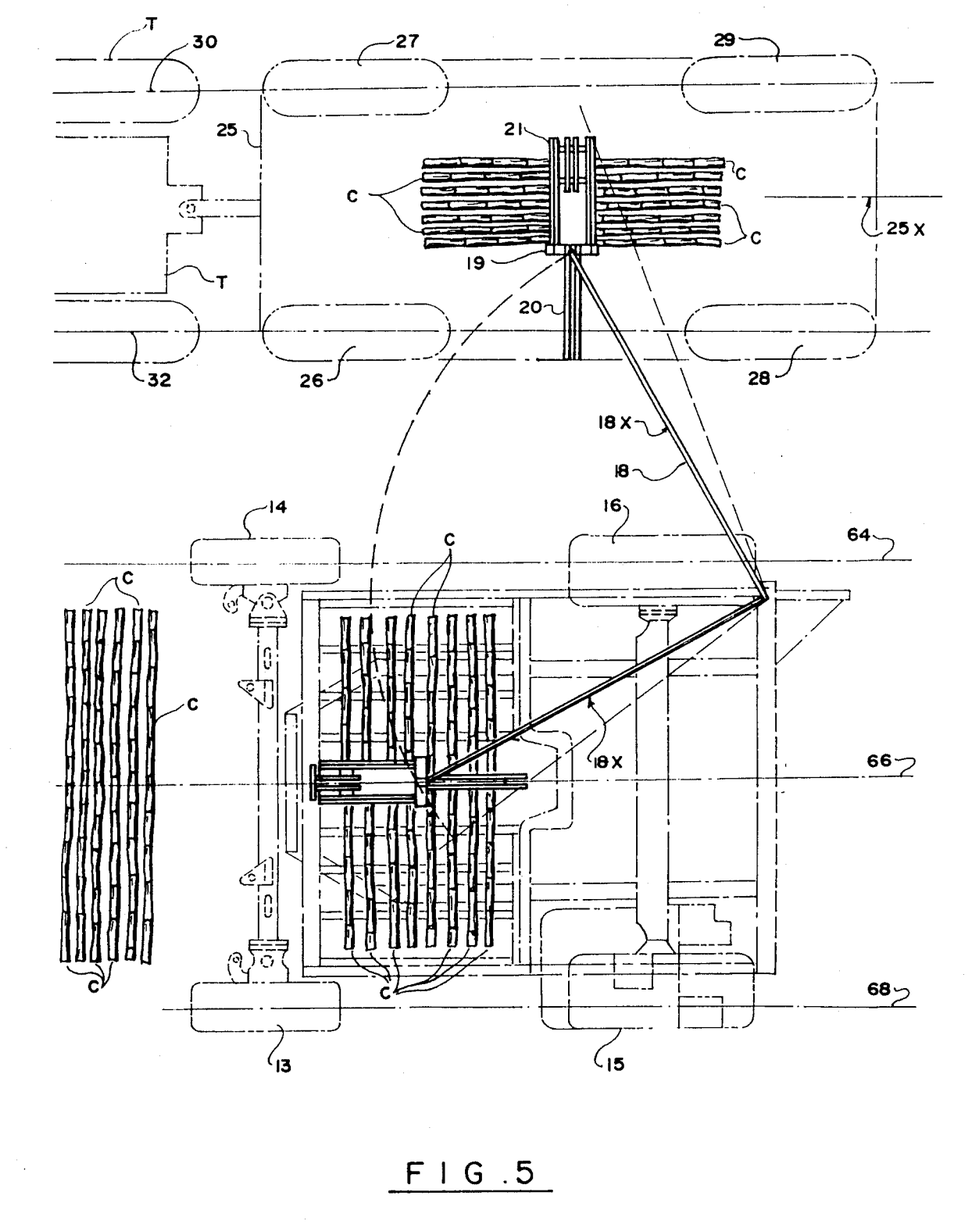
FIG. 5 is a top plan view of the preferred embodiment of the apparatus of the present invention.
Figure 6:
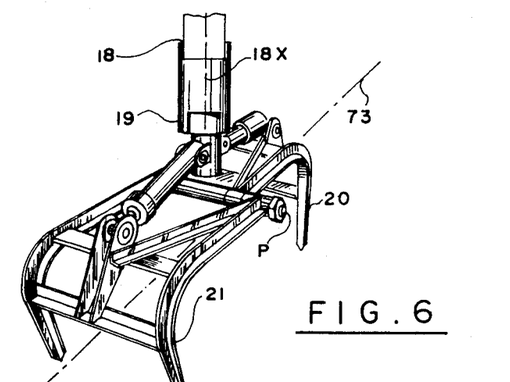
FIG. 6 is a fragmentary view of the preferred embodiment of the apparatus of the present invention.

The forward end portion of the carriage 11 provides a cane gathering mechanism designated generally by the numeral 30. Cane gathering mechanism 30 includes an upper 31 and a lower 32 set of endless chains mounted on rotating sprockets, which can include a plurality of laterally spaced endless chains in each assembly 31, 32 such as is shown in FIG. 2. The use of opposed, upper and lower chains to pick up cane is used on the commercially available, prior art Cameco R-6 loader.

The upper gathering assembly 31 comprises a plurality of laterally spaced endless chains. A similar, corresponding set of lower, spaced endless chains compresses lower gathering assembly 32. In the upper assembly 31, the chains are moving in the direction as indicated by the arrows so that the underside surface 39 of the upper chain assembly 31 moves rearwardly. The top return run of endless chain assembly 31 moves forwardly as indicated by the arrows on the upper surface 40 of assembly 31.

The lower gathering assembly 32 likewise includes a plurality of laterally spaced endless chain assemblies which define an upper planar surface 41 for carrying cane wholestalks C. The direction of movement of the upper surface 41 defined by the chains is indicated by the arrows 42. The return arrows 43 indicate the direction of the chains on the return run which is the bottom surface of assembly 32. Notice that the inside surfaces which include the bottom 39 of gathering assembly 31 and the top surface 41 of gathering assembly 32 both move rearwardly to lift the cane stalks C rearwardly and upwardly while maintaining the cane wholestalks in a generally parallel fashion. These two surfaces 39, 41 are generally parallel planar surfaces, with the cane wholestalks C passing therebetween along a cane travel path that begins at cane intake 44 and ends at cane discharge 45.

The gathered cane wholestalks C fall from discharge 45 as shown by the curved arrows 46, and fall downwardly into basket receptacle assembly 50.

Basket receptacle 50 preferably includes a plurality of parallel, spaced grate bars. The bars are parallel and laterally spaced, having open longitudinal slots therebetween. This spacing of the grate bars and slots allows the tines 20, 21 to pass through the basket assembly 50 in order to completely encircle any cane stalks C held in the basket receptacle 50. The basket receptacle 50 has a flat, horizontal center section 50A and a pair of side angled sections 50B, 50C, with an open top that allows easy access with tines 20, 21.

The bottom 59 of basket assembly 50 is spaced a distance D above the ground surface GS upon which the apparatus 10 rest. Thus, the elevated bottom 59 prevents the tines 25, 26 from digging into the underlying ground surface GS thereby picking up undesireable mud and dirt.

The bottom 59 can be open so that the tines 20, 21 pass through the slots 57. Alternately, the bottom 59 can be plated and solid e.g. by welding metal plate to the bottom side of grate bars creating a floor that can be scraped by the tines during loading.

The use of the gathering assembly 30 allows the cane to be picked up by gathering assembly endless chains neatly, and without pushing the cane or otherwise muddying the cane with the underlying ground surface GS. The cane stalks C harvested by the apparatus 10 of the present invention are very clean and generally free of dirt requiring no extraneous cleaning at the mill. The apparatus of the present invention provides a means for the transfer of the cane wholestalks as gathered by the tines 20, 21 in a clean neat manner which is generally free of dirt and soil. The cane is delivered to the mill in a relatively clean condition.

In FIG. 2, a schematic illustration shows positioning of a one row axle (hard lines) and a two row axle (one wheel 13A in phantom lines) loader 10 with respect to the wheels of a cane cart 25 that is used to carry a large volume of cane to the mill for grinding and processing. A plurality of rows and furrows are shown, designated as 60-69. A row 63 is maintained as a space between loader 10 and cart 25. A row and a half is maintained between cane stalks C and cart 25. This is important, because it prevents rollover damage by the cart 25 of cane wholestalks C being picked up by loader 10. Additionally, mud which is splashed by the wheels of cane cart 25 will not muddy the cane stalks C as easily with this improved configuration and method. This improved positioning and method is possible because of the improved loader boom and grapple configuration of the present invention as will now be described more fully.

A three wheeled loader frame could be employed, typically having two larger front wheels 13, 14 (FIG. 8) and a smaller usually powered steered rear wheel 17S.

The chain type pickup 19 and basket 22 can be seen in co-pending prior patent application Ser. No. 194,807, Filed on May 17, 1988 and naming Cameco Industries, Inc., as assignee.

The furrows include even numbered designations in FIG. 2 namely 60, 62, 64, 66 and 68. The raised/planted rows include odd numbered designations in FIG. 2 namely 61, 63, 65, 67 and 69. One of the advantages of the present invention is that the tractor T and cart 25 have wheels which travel one row away from the heap of canestalks C being loaded, eliminating the possibility of rolling on the wholestalk cane C or mud being splashed onto the heap row with the canestalks C. This spacing of the hauling tractor T and cane cart 25 with respect to the loader 10 can best be seen in FIGS. 2, and 3–6.

Figure 7:
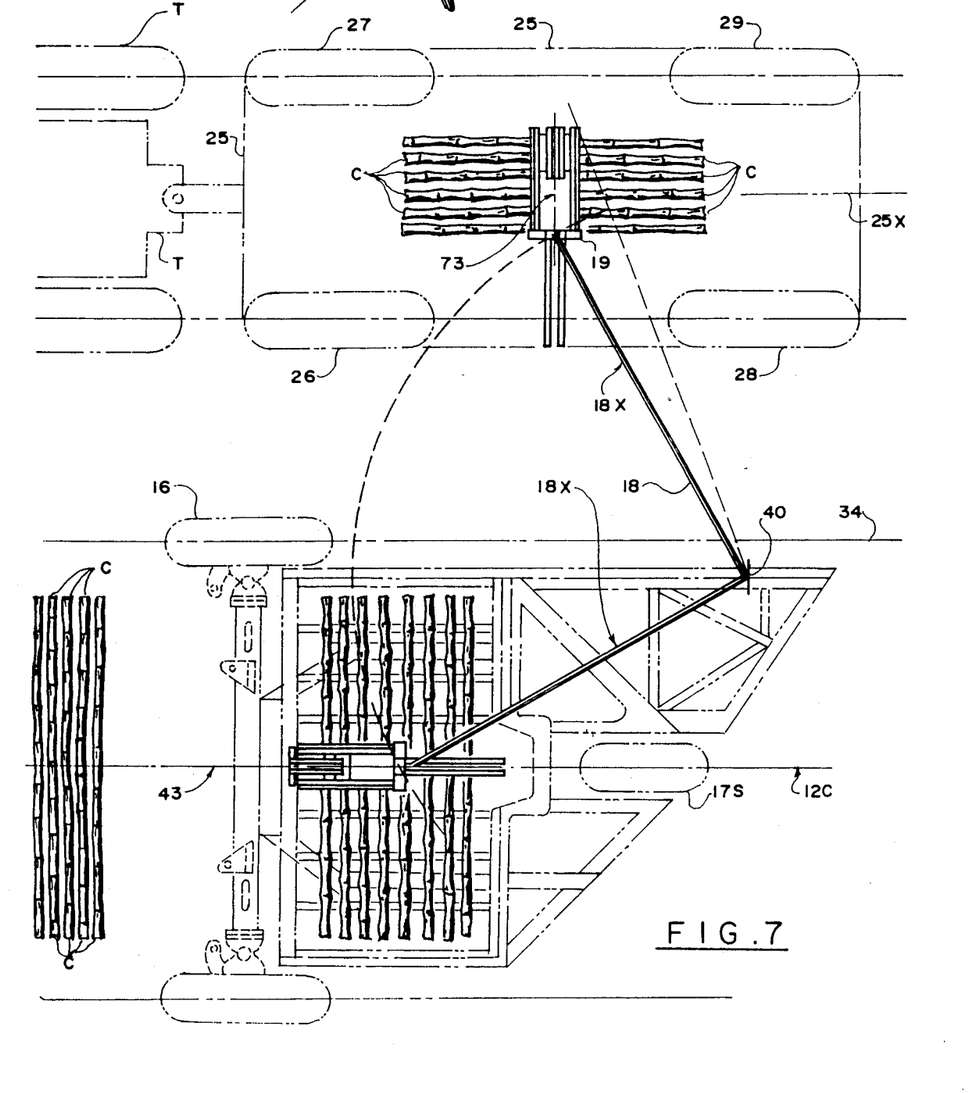
FIG. 7 is a top view of another embodiment of the apparatus of the present invention using a three wheel loader frame.

The boom 18 end portion supports a skewed grapple arrangement at 19. Boom 18 is elongated and is substantially linear along a radial line or direction away from the pivot 17 as can best be seen in FIGS. 5 and 7, with the boom longitudinal axis 18X being designated in those Figures.

The grapple is comprised of a pair of jaws 20, 21 mounted to pivot at 19 and operated for example with hydraulic cylinders to open and close along a jaw travel path which is skewed with respect to the longitudinal axis 18X of boom 18. This arrangement allows the boom 18 to be pivoted about 17 through a very small arc of travel of for example ninety degrees (90°). This allows the boom to be made smaller and increases visibility for the operator. As can be seen in The pivot 17 is preferably offset from the centerline 12 C of the frame but the skewed orientation of the grapple with respect to the boom axis as aforedescribed allows the canestalks C to be grabbed at a position which spaces the canestalks well away from the cane cart 25 and its hauling tractor T. The skewed arrangement also allows the canestalks to be oriented longitudinally with respect to the longitudinal axis 25 X of the cane cart. Thus, the fixed skewed arrangement of the grapple with respect to the boom affords advantages over the prior art including better visibility for the operator and reduced boom length which reduces the swinging mass. Further, the piled cane can be located to the left hand side of the loader carriage frome centerline 12X with loading to the right-hand side of the loader. This improved configuration moves the ends of the cane heap row/pile away from the furrow that the tractor T and cane carts 25 are running in. This improved positioning eliminates roll over and damage to the ends of the cane and eliminates or minimizes dirtying of the cane which can be caused by the splashing of mud when the tractor T and cane cart 25 are running in a common furrow with their adjacent wheels.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A wholestalk sugar cane loader apparatus for picking up and accumulating windrowed cane wholestalks from a cane field ground surface having heap rows and furrows comprising:
    (a) a wheeled movable carriage adapted to travel along a path defined by the carriage longitudinal center axis, generally parallel to the longitudinally extending elongated heap rows with the carriage wheels trailing in parallel furrows;
    (b) means, positioned adjacent the carriage for movement therewith during gathering of windrowed wholestalk cane, for accumulating wholestalk cut cane from a resting position on the cane field ground surface into a heap;
    (c) the accumulating means including an elevated platform surface on the carriage for supporting cane wholestalks a distance above the ground surface;
    (d) an elongated boom pivotally mounted at a rotary connection to the carriage and extending away from the rotary connection along a radial line defining a boom longitudinal axis; and
    (e) a pair of opposed jaws, attached to a distal end portion of the boom opposite the rotary connection, the jaws being movable with respect to each other along a jaw travel path that allows the jaws to freely access the platform, the jaw travel path and the boom longitudinal axis being fixed during operation to intersect each other defining an acute angle therebetween.

2. The loader apparatus of claim 1 wherein the rotary connection is positioned at the rear portion of the carriage behind the platform and the boom has a length sufficient to position the grapple at least at the middle portion of the carriage so that cane stalks on the platform can be grasped by the grapple.

3. The apparatus of claim 1 wherein the carriage has a longitudinal axis and the rotary connection is offset laterally from the carriage longitudinal axis.

4. The apparatus of claim 3 wherein the defined acute angle places the jaw travel path parallel to the carriage longitudinal axis when the boom rotates the jaws to a position forwardly of the rotary connection, and wherein the boom defines an acute angle with the carriage longitudinal axis.

5. The loader apparatus of claim 1 wherein the boom travels between "pick-up" and "discharge" position during use which respectively positions the grapple forward of the carriage and left of the vehicle center axis in the "pick-up" position when gathering cut cane wholestalks, and to the right of the carriage centerline in the "discharge" position at the cane cart.

6. The apparatus of claim 5 the cane stalks are placed in a generally aligned position with respect to one another during transfer of the cane stalks between "pick-up" and "discharge" positions.

7. The apparatus of claim 1 wherein the carriage has four wheels, and the wheelbase is one row wide so that the left and right wheels can occupy adjacent furrows.

8. The loader apparatus of claim 1 wherein the carriage has four wheels and the wheelbase is two rows wide.

9. The loader apparatus of claim 1 wherein the carriage has three wheels.

10. The loader apparatus of claim 9 wherein the loader has larger front wheels and a single rear wheel.

11. The loader apparatus of claim 1 further comprising endless chain pick-up means for transferring cut cane wholestalks upwardly with respect to the ground surface and to the platform.

12. A method of loading cut, wholestalk sugar cane with a wheeled loader having a first wheelbase defined by left and right loader wheels, into a wheeled receptacle vehicle having a second wheelbase defined by left and right receptacle wheels, comprising the steps of:
    (a) positioning the first and second wheelbases in parallel furrows and with at least one row space therebetween;
    (b) accumulating a plurality of the cut cane wholestalks upon an elevated platform portion of the wheeled loader; and (c) using a pivoting boom on the loader to transfer cane wholestalks through a short pivotal arc of less than one hundred eighty degrees (180°) between a "pick-up" position wherein cut wholestalks on the platform are grasped with the boom and a "discharge" position wherein the cut wholestalks are dropped into the wheeled receptacle vehicle.

13. The method of claim 12, wherein the boom travels an arc of approximately ninety degrees (90°) between "pick-up" and "discharge" positions.

14. The method of claim 12 wherein in step "b" the cut wholestalks are spaced from the wheeled receptacle vehicle by at least one row.

15. The method of claim 12 wherein the wheelbase of the loader is two rows wide.

16. The method of claim 12 wherein the loader wheelbase is one row wide.

17. The method of claim 12 wherein in step "b", the boom extends forwardly of the loader rear end portion to grab cane wholestalks in the "pick-up" position.

18. The method of claim 12 wherein the loader boom is an elongated boom with a longitudinal axis mounted at the rear portion of the loader, and includes a boom end with a pair of jaws, and in step "b" the jaws travel along a path that is skewed with respect to the boom longitudinal axis.

19. The method of claim 12 further comprising the step between steps "a" and "b" of preliminarily gathering a plurality of cut cane wholestalks from the ground to the elevated platform on the loader wherein the wholestalks are placed together in a bundle fashion and in step "c" the boom grasps the cane wholestalks from the platform.

20. The method of claim 12 wherein the loader wheels and receptacle vehicle wheels travel in separate laterally spaced apart furrows so that the loader and receptacle vehicle can align generally side-by-side during the loading operation.

21. The method of claim 12 wherein the boom pivots about a point of attachment to the rear portion of the loader, and the "discharge" position is forwardly of the said point of attachment.

22. The method of claim 12 wherein the loader and receptacle vehicle are maintained in a side-by-side relationship during loading, spaced a row apart with the right wheels of the loader being positioned adjacent the left wheels of the receptacle vehicle.

* * * * *